(12) United States Patent
Wehrli et al.

(10) Patent No.: US 6,486,429 B1
(45) Date of Patent: Nov. 26, 2002

(54) ELECTRIC DISCHARGE MACHINE AND MODULE SET FOR ASSEMBLY OF MACHINE TOOLS

(75) Inventors: Peter Wehrli, Ascona (CH); René Brun, Prévessin (FR)

(73) Assignees: Agie SA, Losone (CH); Charmilles Technologies SA, Satingny (CH)

( * ) Notice: Subject to any disclaimer, the term of this patent is extended or adjusted under 35 U.S.C. 154(b) by 2 days.

(21) Appl. No.: 09/614,900

(22) Filed: Jul. 12, 2000

(30) Foreign Application Priority Data

Jul. 13, 1999 (DE) ........................................ 199 32 645

(51) Int. Cl.[7] ................................................ B23H 1/00
(52) U.S. Cl. ................................ 219/69.11; 219/69.12; 219/69.2
(58) Field of Search .......................... 219/69.11, 69.12, 219/69.14, 69.2; 409/134, 137

(56) References Cited

U.S. PATENT DOCUMENTS

| | | | | |
|---|---|---|---|---|
| 3,511,129 A | * | 5/1970 | Muller | ................ 409/137 |
| 3,731,043 A | | 5/1973 | Ullmann et al. | .......... 219/69 V |
| 3,731,044 A | | 5/1973 | Ullmann et al. | .......... 219/69 V |
| 3,731,045 A | | 5/1973 | Ullmann et al. | .......... 219/69 V |
| 4,363,949 A | | 12/1982 | Pfau et al. | ............... 219/69 W |
| 4,661,678 A | | 4/1987 | Wavre | ..................... 219/69.12 |
| 4,808,787 A | | 2/1989 | Futamura | ................. 219/69 W |
| 4,973,812 A | | 11/1990 | Aramaki et al. | ......... 219/69.12 |
| 4,983,802 A | | 1/1991 | Kobayashi et al. | ...... 219/69.12 |
| 5,070,224 A | | 12/1991 | Töpfer et al. | ............ 219/69.12 |
| 5,086,203 A | | 2/1992 | Kobayashi et al. | ...... 219/69.12 |
| 5,111,016 A | | 5/1992 | Lodetti et al. | ........... 219/69.12 |
| 5,243,165 A | | 9/1993 | Hosaka | ..................... 219/69.12 |
| 5,243,167 A | * | 9/1993 | Lundquist et al. | ....... 219/69.12 |
| 5,285,600 A | * | 2/1994 | Shepley | |
| 5,326,954 A | | 7/1994 | Lenard et al. | ........... 219/69.12 |
| 5,945,900 A | * | 8/1999 | Beck et al. | .............. 219/69.11 |
| 6,145,178 A | * | 11/2000 | Green | |

FOREIGN PATENT DOCUMENTS

| | | |
|---|---|---|
| CH | 656 082 A5 | 6/1986 |
| DE | 34 44 390 C1 | 12/1984 |

(List continued on next page.)

OTHER PUBLICATIONS

W. Beitz and K.–H. Küttner, "*Taschenbuch für den Maschinenbau,* " Dubbel, 14th. completely revised and enlarged edition, Berlin, Springer 1981, pp. 1024 and 1025. with Abstract.

"*Kompaktes BAZ für Formenbauer,*" Werkzeug & Formenbau, Feb., 1999, p. 30, with Abstract.

*Primary Examiner*—Geoffrey S. Evans
(74) *Attorney, Agent, or Firm*—Marshall, Gerstein & Borun (57) ABSTRACT

An EDM machine for machining a workpiece is disclosed. The EDM machine includes a machine frame having a central stationary machine body and a machining electrode to machine the workpiece. Machining occurs by producing a relative movement in at least one of an X axial direction and a Y axial direction between the machining electrode and the workpiece. The machine also includes a first axial slide for moving at least one of the workpiece and the machining electrode in the X axial direction, and a second axial slide for moving at least one of the machining electrode and the workpiece in the Y axial direction. The first axial slide is mounted in a substantially vertical plane on the machine body for lateral movement in a substantially horizontal direction.

25 Claims, 4 Drawing Sheets

U.S. PATENT DOCUMENTS

| | | |
|---|---|---|
| DE | 35 24 377 C2 | 7/1985 |
| DE | 39 17 913 A1 | 6/1989 |
| DE | 41 15 107 C2 | 11/1992 |
| DE | 197 82 278 | 6/1997 |
| DE | 196 20 516 A1 | 11/1997 |
| EP | 0 261 547 A2 | 9/1987 |
| EP | 0 467 060 B1 | 6/1991 |
| EP | 0 507 741 A2 | 4/1992 |
| JP | 55-58931 | 5/1980 |
| JP | 62-213923 | 9/1987 |
| JP | 63-197022 | 12/1988 |
| JP | 64-078723 | 3/1989 |
| JP | 1-274924 | 11/1989 |
| JP | 2-126724 | 10/1990 |
| JP | 3-96227 | 4/1991 |
| JP | 3-202227 | 9/1991 |
| JP | 4-146024 | 5/1992 |
| JP | 6-114634 | 4/1994 |
| JP | 8-118159 | 5/1996 |
| JP | 2970883 | 8/1999 |
| WO | WO 99/00212 | 1/1999 |

* cited by examiner

ELECTRIC DISCHARGE MACHINE AND MODULE SET FOR ASSEMBLY OF MACHINE TOOLS

FIELD OF THE INVENTION

The invention relates generally to EDM machines such as erosive cutting machines and die-sinking machines, and, more particularly, to axial arrangement of such machines, as well as a set of modules for assembly of machine tools.

BACKGROUND OF THE INVENTION

EDM machines are widespread, for example, in the form of erosive cutting machines and die-sinking machines. In such machines, a machining tool in the form of a wire electrode or cavity sinking electrode is moved relative to a workpiece clamped on a tool board in order to produce an electrical spark discharge between the machining electrode and the workpiece. Such machines include a machine frame with drive kinematics to produce the relative displacement between the workpiece and machining electrode that determines the machining contour, a tool table with appropriate means of clamping to accept one or more workpieces, a generator, a CNC control, as well as devices to rinse the working gap and to process any employed working fluid.

Machine tools, and especially EDM machines, can be used in a variety of ways. Therefore, different designs have been developed over time. Such designs depend on the corresponding requirements, like selling price, maintenance costs, workpiece size and maximum travel, quality, productivity, flexibility and automatability, space requirements, operating comfort, etc. The emphasis in the development of the machine tool can therefore be completely disparate. Such requirements are often at variance, like space requirements of the machine, on the one hand, and maximum admissible workpiece size, on the other. It would be desirable, precisely in the last-named case, to have the most compact design possible, but nevertheless a capability of also machining larger workpieces. These requirements are only met to a limited degree in the designs of EDM machines known thus far.

For example, most available erosive cutting machines have a C-machine frame or a bridge frame. An example of an erosive cutting machine is the C-frame design described in DE 35 24 377 A1 of the applicant. The C-frame is constructed from several blocks, namely, a machine bed, a column and a machine head. The wire electrode is tightened in the working space of the machine between an upper and lower wire guide head and moved relative to the workpiece in an X/Y main axial plane. Different axial arrangements are indicated for this purpose. The main axial movement in the X/Y direction is conducted with a coupled X/Y crosstable, which moves either the work table, the column of the machine frame, or the head of the machine frame in the X/Y main axial directions.

In an erosive cutting machine of the bridge design, the machine frame includes a machine bed and a closed bridge-like column arranged on it. A worktable, together with work tank, is displaceably mounted on the machine bed in a main axial direction, (for example, the Y direction). The X advance movement of the wire electrode is decoupled from it and produced by an X-slide, which can be displaced horizontally on the cross-rail of the bridge column above the work space. This type of bridge machine is suitable for machining large workpieces. However, it also requires correspondingly large set-up space. The work space of the machine is also only marginally accessible, because of the closed design, and therefore only suitable with limitations for integration of automation devices.

Another machine for an erosive cutting machine is described in U.S. Pat. No. 5,243,165, in which the X/Y main axial slides are arranged independently of each other, in similar fashion to the bridge design. The machine frame is constructed in the fashion of a C-frame with a machine bed and a vertical column fastened to it. An X-slide is displaceably arranged in a horizontal plane on the machine bed on which the tool table and work tank sit. The workpiece is, therefore, only moveable in the X direction. A Y-slide, to which the upper and lower wire guide head is coupled, is arranged directly on the machine column and moves only the wire electrode in the Y direction. Another crosstable system (so-called U/V crosstable) arranged directly on the upper wire guide head permits relative deflection of the upper wire guide head relative to the lower one. A Z-drive for the upper wire guide head is additionally provided.

A shortcoming in this design and in the aforementioned C-frame design is that the machine frame, assembled from several parts (e.g., the machine bed, the column, and, optionally, the machine head), does not possess sufficient intrinsic rigidity in the so-called two-or multiblock design with high accuracy requirements. Consequently, the set-up location of the machine must satisfy increased requirements on floor rigidity. For example, the machine column and the machine bed must be provided with multiple supports on the floor. Set up and alignment of such a machine is very demanding. In particular, installation of different components of the machine frame must occur very carefully, so that the orthogonality of the axial movement is fulfilled.

A three-axis cutting machine, in which the X- and Y-slides are moveable independently of each other, is also shown in the journal "Werkzeug & Formenbau", February 1999, page 30. The X-slide is also laterally displaceably arranged on the machine frame in the fashion of a console, and the Y-slide, equipped with a Z-drive, is arranged on the top of the machine frame. However, details concerning the design of the machine frame are not disclosed. Nor is there any indication in the direction of an EDM machine.

DESCRIPTION OF THE PREFERRED EMBODIMENTS

For brevity, the following description and figures are restricted to only those components of an EDM machine needed to understand the disclosure. Additional machine elements, like a generator and CNC control, are not shown, since they are self-evident to a person of ordinary skill in the art. Terminology that serves for easier readability of the description is also used, but is not to be understood restrictively. For example, the expressions "top" and "bottom" refer to EDM machines with vertical setup. Moreover, components corresponding to each other in the different examples are marked with the same reference numbers.

Figure 1:
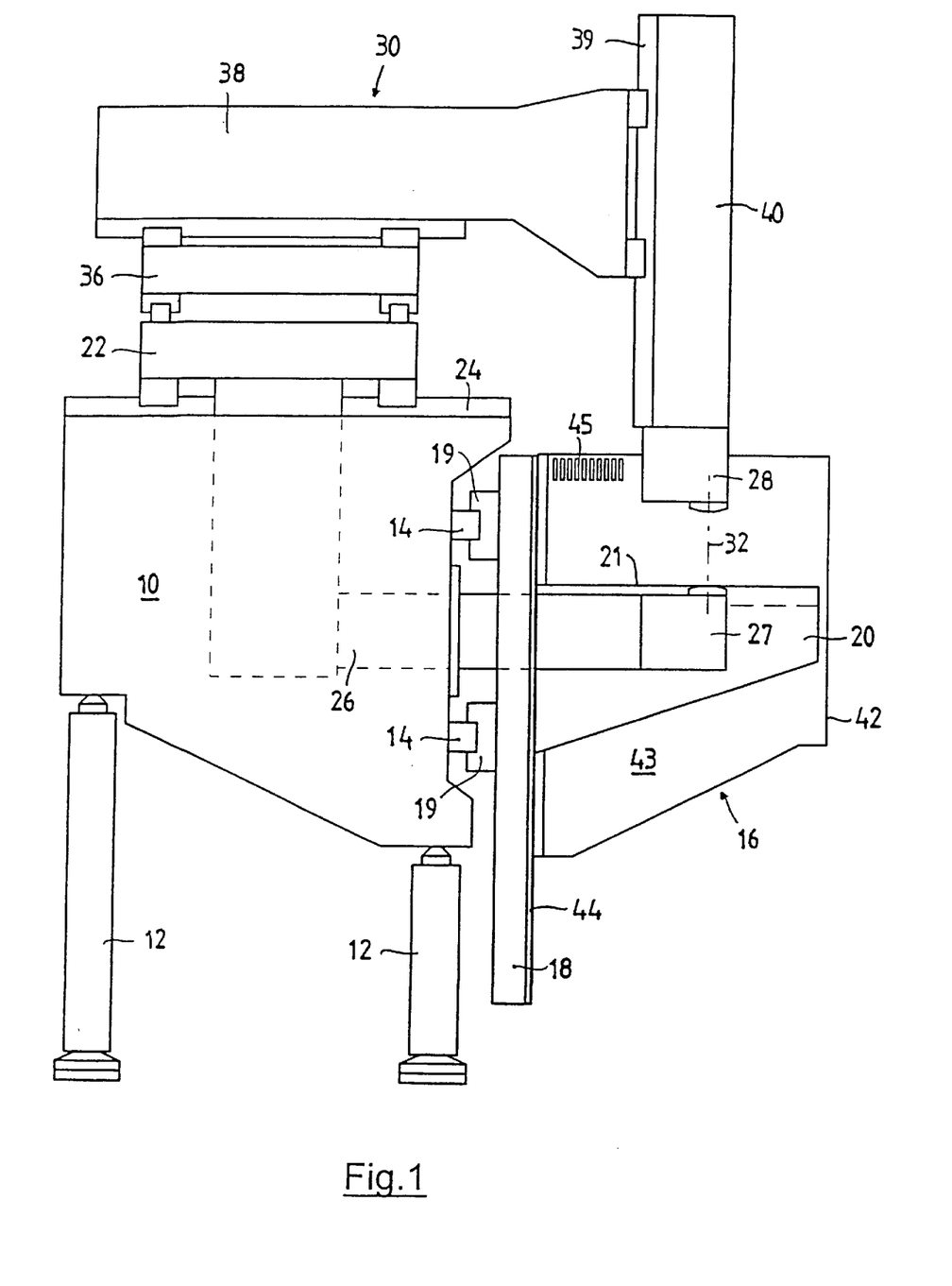
FIG. 1 is a longitudinal cross-sectional view of components of a first EDM machine constructed in accordance with the teachings of the instant invention.

FIG. 1 shows an erosive cutting machine of the monoblock design and constructed in accordance with the teachings of the invention. The machine frame, which deviates from the known two- or multiblock design, includes a single central machine body 10, which here includes three upright columns 12, namely, a long rear and two shorter front columns. Such support of the machine body 10 is particularly suited for EDM machines of medium to small size. Larger machines preferably have a closed machine body for stability reasons, which reaches the floor and is optionally supported on three or more support sites.

A horizontally running pair of rails 14 is attached on one vertical surface on the front (facing the working space in the machine) side of the machine body 10. A console-like slide 16-is mounted to the rails 14 for movement in a main axial direction (say, the X direction). One or more workpieces to be machined are clamped in a substantially horizontal mounting surface on the console-like slide 16, which protrudes laterally in the fashion of a console from the machine body 10 and is referred to below as the "X-console." The X-console executes the X-main axial movement during machining.

The X-console 16 has a compact design with good geometric base accuracy. For this purpose, a vertical plate 18 (so-called X-plate) is screwed to four guide slides 17, each of which are guided in pairs on pair of rails 14. This X-plate 18 serves as a base for different components in the fashion of a tool table rotated by 90°, as described below. A beam-like workpiece support 20 (schematically depicted in FIG. 1), is fastened directly on the X-plate 18. A workpiece (not shown in FIG. 1) is mounted with appropriate clamping devices on a horizontal workpiece support surface 21 of support 20.

The second main axial movement in the Y direction is produced by a Y-slide 22, which is mounted to move in the Y direction on a pair of rails 24 in a horizontal plane on the top of the machine body 10. An L-shaped lower wire guide arm is rigidly connected on the bottom to the Y-slide 22. The lower wire guide arm extends through the interior of the machine body 10 and through the X-console 16 into the working space of the machine and carries a lower wire guide head 27 on its front end. At a spacing above the lower wire guide head 27, an upper wire guide head 28 is arranged in the working space in the machine. The upper wire guide head 28 is attached on the free end of an upper wire guide arm 30. For machining of a workpiece, a wire electrode 32 (shown schematically) is guided between the upper and lower wire guide heads 28 and 27. The cutting contour is determined by the relative movement in the X/Y direction between a workpiece and wire electrode 32. In the practical example of FIG. 1, the upper wire guide arm 30 is connected via several intermediate drives, which are further explained below, to the Y-slide 22. The lower L-shaped wire guide arm 26 is also attached to this Y-slide 22 so that, during movement of the Y-slide 22, both wire guide arms 26 and 30, and thus both wire guide heads, are moved parallel in the Y-main axial direction. The workpiece, on the other hand, stands still in the Y direction and is moved only in the X direction by the X-console 16. Naturally, the X-console 16 and Y-slide 22 are numerically controlled via a CNC control, in order to produce the desired cutting contour in the workpiece.

The wire guide heads 27 and 28 in the arrangement just described lie in vertical alignment, one above the other, so that only straight cuts (parallel to the Z axis) can be performed. For cutting of conical cuts, a so-called U/V cross slide is additionally provided for Cartesian adjustment of the upper wire guide head 28 in a horizontal plane (the so-called U/V plane), relative to the lower wire guide head 27. For this purpose, a U-slide 36 is mounted to move at right angles directly on the Y-slide 22, and an additional V-slide or V-slide extension 38 is mounted to move at right angles to the U-slide 36. U- and V-slides 36, 38 are connected in the fashion of a Cartesian cross slide. Moreover, both slides are connected to the Y-slide 22 of the machine, so that, during a Y-main axial movement by the Y-slide, the U- and V-slides are automatically carried along.

The upper wire guide head 28 is also carried by a quill 40 that can be moved in the vertical direction (Z-main axial direction), which is mounted to move on the front free end of the V-extension 38 via corresponding guide rails 39. This arrangement largely corresponds to the Z-drive of the die-sinking machine. During each displacement of Y-slide 22, the quill 40 is also carried along, in addition to the U- and V-slides 36, 38. It is understood that all of the described axial drives have a motor and geartrain, as well as perhaps threaded spindles that act on the described guide slides, in order to allow the desired movement under control of the numerical controller. As an alternative, other drive means can also be used, for example, linear motors.

In the example of FIG. 1, the guides of the X/Y main axial slide 16 and 22 are fastened directly to the central machine body 10 and the U/V and Z-drives 26, 28 and 40 are fastened to the body 10 indirectly via the Y-slide 22, which, with corresponding geometric base accuracy of the machine body 10, guarantees very good orthogonality and high rigidity of the design. The moving X-console 16 permits very good accessibility in the work space both for the operator of the machine and for any automation devices, like robots, changer systems, automated measurement and monitoring devices or other aids.

Figure 2:
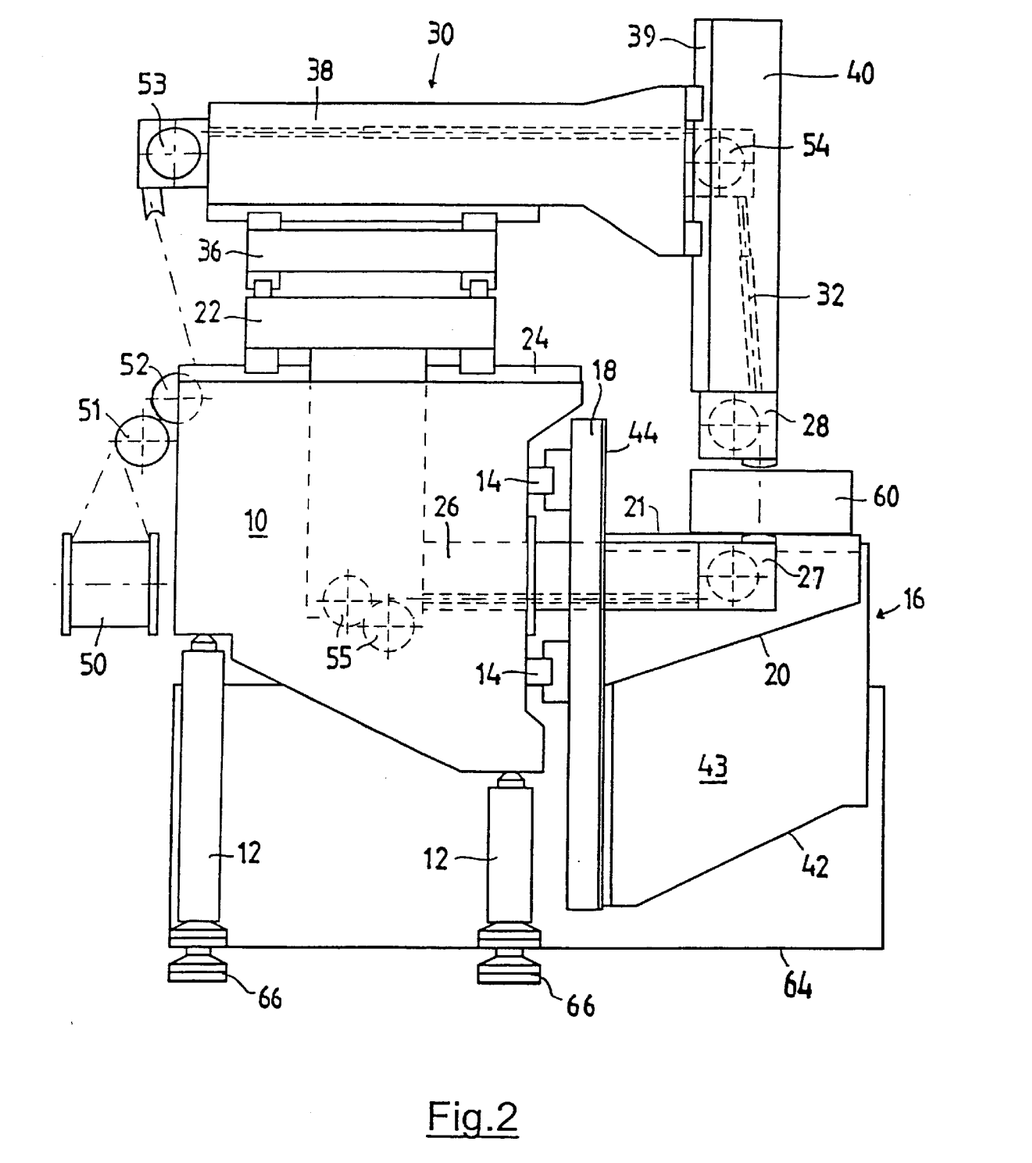
FIG. 2 is a longitudinal cross-sectional view of the EDM machine of FIG. 1 with additional components.

The erosive cutting machine of FIG. 1 advantageously permits integration of a lowerable work tank to receive a working liquid, in which EDM of the workpiece occurs. The space beneath the moving X-console 16 is largely free, so that any work tank can be lowered into it during the loading and unloading processes, in order to provide access to the work space of the machine from at least three sides. A lowerable work tank is marked 42 in FIG. 1 and is shown in its working position during-workpiece machining. (FIG. 2 shows the work tank 42 in the lowered position). The work tank 42 is assembled from a work tank part 43, which is vertically moveable and open to the side of the machine body 10. The work tank part 43 includes a front wall, the two side walls, a bottom descending toward the machine body 10, and a fixed rear wall 44 which lies directly against (and is attached to) the X-plate 18. The X-plate 18 can be made flat so that the rear wall 44 of the work tank 42 can be supported on it without problem during sealing. Vertical guide rails are provided on both side walls of the work tank 42. The guide rails are anchored on the X-plate 18. The moving part 43 of the work tank 42 can be moved vertically along the guide rails by means of an appropriate lifting mechanism.

To seal the contact region between the stationary work tank rear wall 44 and the moving work tank part 43, a rubber seal, inflatable with air, is used. The rubber seal is attached on the contact surfaces of the side and bottom walls of the moving work tank part 43 facing the work tank rear wall 44 for sealing contact with the rear wall 44. If the moving work tank part 43 is raised into and reaches the work position shown in FIG. 1, the rubber seal is exposed to compressed air, so that a secure support under pressure is produced on the work tank rear wall 44 and thus tightness of the work tank 42. The lifting and lowering processes of the work tank 42 and the accompanying activation of the rubber seal are controlled automatically by the CNC control as a function of the machining process. Naturally, in a simplified variant, a simple sealing profile can also be used without compressed air loading (so-called passive seal).

FIG. 2 shows the erosive cutting machine of FIG. 1, but with additional machine components. The complete trend of the wire electrode 32 is shown, which is unwound from a wire spool 50 on the back side of machine body 10 in known fashion under tension and guided over several deflection rollers 51, 52 and 53 and along the V-extension 38 to quill 40. The wire electrode 32 is deflected again there by a roller 54 and runs to the upper wire guide head 28, where a current feed unit (not shown) is situated to supply the machining current. The wire electrode 32 runs further from the upper wire guide head 28 through the work space, in which a workpiece 60 is clamped for machining, to the lower wire guide head 27 and is guided there with repeated reversal to a wire drawing device 55 that maintains wire tension. The wire guide heads 27, 28 keep the wire electrode 32 in a defined position relative to the workpiece 60. The X-console 16 produces an advance movement of the workpiece 60 in the-X-main axial direction; which, together with the movement caused by the Y-slide 22 of the upper and lower wire guide heads 28, 27 (and, thus, the wire electrode 32 in the Y-main axial direction) and, optionally, the U/V axial movements, result in relative movement between the workpiece 60 and the wire electrode 32. The relative movement corresponds to the desired cutting contour.

EDM generally occurs in a bath of working liquid for thermal stabilization of the workpiece 60. During erosive cutting, this working liquid generally comprises treated water. The work tank 42 to accept the dielectric water is shown in FIG. 2 in its lowered position. Immediately before the beginning of machining, the work tank 42 is raised into the working position, as shown in FIG. 1, and filled with water to a mark at which the workpiece 60 is at least fully immersed in the water. When machining on the workpiece 60 is completed, the work tank 42 is lowered again and, thus, exposes the work space for loading and unloading of workpieces (see FIG. 2). The moving work tank part 43 is then lowered with its upper edge to a height just beneath the lower edge of workpiece 60. The work tank rear wall 44 (and the supporting X-plate 18) extend far enough downward that the moving work tank part 43 also fully lies on the work tank rear wall 44 in this position, and the work tank 42 is also tightly closed in the lowered position. In contrast to known designs, the usual emptying of the working liquid is eliminated if the operator or an automatic device requires access to the workpiece. As required, and depending on the application, the moving work tank part 43, together with the working liquid, is moved downward into the lowered position and raised upward again vertically with the working liquid for the beginning of machining, while the tightness of the work tank 42 is maintained. With this work tank arrangement, there is also the possibility of dispensing with separate, costly level regulation. As shown in FIG. 1, level regulation can occur by several overflow slits 45 that are introduced in horizontal alignment in the side walls of the vertically moveable work tank part 43.

The unit for the working liquid is arranged in FIG. 2, at least partially directly beneath the work tank 42. For this purpose, the entire erosive cutting machine, according to FIG. 2, stands in a container 64, whose outline essentially corresponds to the outline of the entire machine. As a type of extension of columns 12, the container 64 is supported on three or correspondingly more support sites 66 relative to the floor. A unit for cleaning and treatment of the working liquid is provided. It includes a filter device, an ion exchange apparatus, filling and rinsing pumps with the corresponding inlets and outlets into the work tank 42, and, optionally, a cooling device to cool the dielectric. Water (not further shown) is situated in the container 64 beneath or in the immediate vicinity of the lowering zone of work tank 42. A space to mount a container to trap any leakage liquid or overflow liquid from the work tank 42 and for its return to the unit for treatment of the working liquid is also present beneath the X-console 16.

Figure 3:
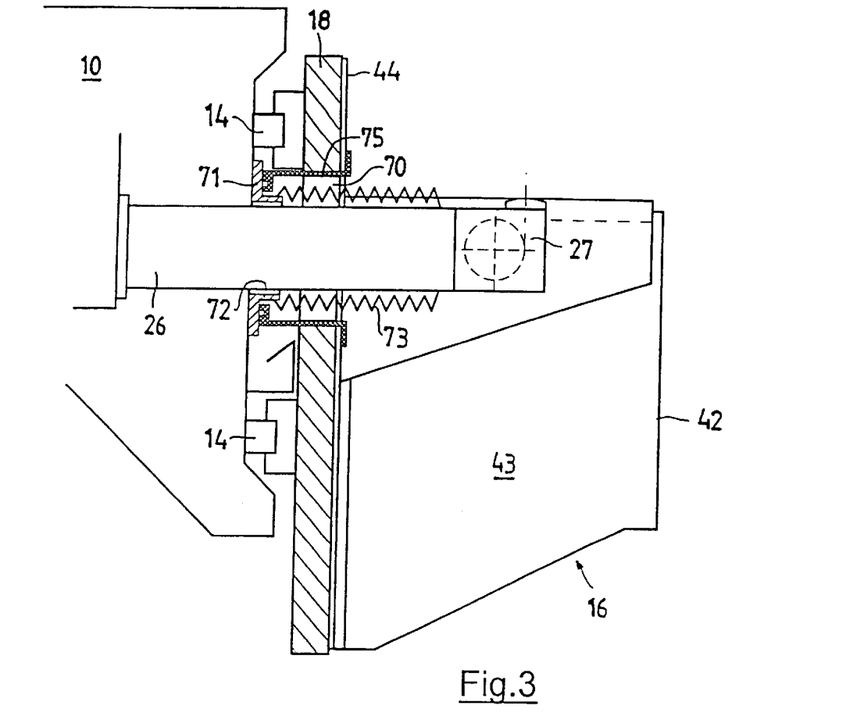
FIG. 3 is a detail view in longitudinal section of the lower wire guide arm and the X-console of the EDM machine of FIG. 1.

If a working liquid is used during EDM, it is necessary in the present machine design to pass the lower wire guide arm 26 through one wall of the work tank 42 and to seal this passage region against escape of working liquid. Moreover, it must be guaranteed that an unhampered two-dimensional movement in the X/Y plane remains possible between the lower wire guide arm and workpiece. FIG. 3 shows a section from this critical region of the erosive cutting machine according to FIGS. 1 and 2. The wire guide arm 26 emerging on the front side of machine body 10 extends through the X-plate 18 of the moving X-console 16 and the rear wall 44 attached to it of the work tank 42 into the work space of the machine. The X-plate 18 and the work tank rear wall 44 lying on it have an elongated opening oriented in the X direction, dimensioned so that the wire guide arm 26 extends into the work space without contact during any X/Y displacement movements. On the outside of machine body 10, a sealing sheet 71 is arranged, which extends roughly over the width of X-console 16 in the X direction and has a round tube piece 72 for moveable passage of the wire guide arm 26. The sealing sheet 71 serves as a support surface of a sliding seal, still to be described further below. A first sealing device, in the form of a cylindrical bellows seal 73, is provided between the sealing sheet 71 and the wire guide arm 26, which is attached with one end on the periphery of tube piece 72 and on the other end to the outer periphery of the wire guide arm 26. Such bellows seals also maintain tightness during relatively large displacement of the wire guide arm 26 in the Y direction. However, any other expandable elastic seal or combination of seals can be used that are sufficiently expandable in reaction to movement of arm 26. The bellows seal 73 primarily prevents the working liquid from escaping from work tank 42 through opening 70 and sealing sheet 71 in machine body 10. A second sealing device 75 is provided between sealing sheet 71 and the rear wall 44 of the work tank, which is firmly connected to the rear wall 44 of the work tank and, relative to sealing sheet 71, guarantees sliding sealing during movement of X-console 16, and, thus, work tank 42 relative to the lower wire guide arm 26 in the X direction, and, thus, prevents the working liquid from escaping from work tank 42 through opening 70. With this sealing design, the work tank 42 and the wire guide arm 26 can be moved relative to each other in the X/Y direction impact-free and tight with respect to the working medium.

Figure 4:
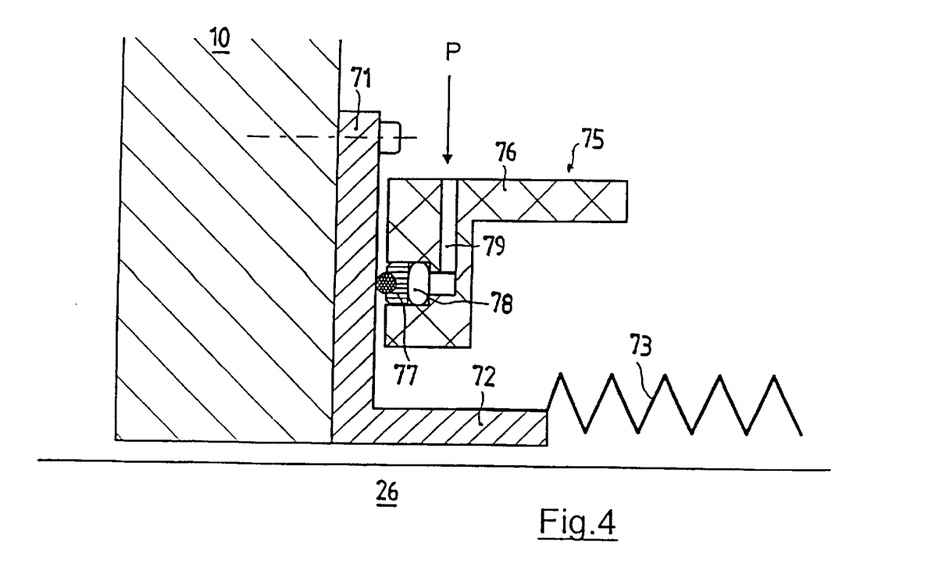
FIG. 4 is an enlarged partial view of the sealing elements between the lower wire guide arm and work tank of FIG. 3.

FIG. 4 shows an enlarged partial view of the sealing design in FIG. 3, in which only half of the symmetric structure, relative to the axis of the guide arm, is shown. The sealing device 75 is arranged moveable on one end on sealing sheet 71 and fastened on the other end to the rear wall 44 of work tank 42. The sealing device 75 is multipart and includes a concentric profile 76, which, as is apparent in FIG. 3, fills up opening 70 and is rigidly attached to the work tank rear wall 44 with an outward folded edge. The opposite end of profile 76 is directed radially inward and forms a contact surface facing sealing sheet 71. In this contact surface, a sealing element 77 with low sliding resistance is admitted, for example, a PTFE profile loaded with graphite, which ensures a sliding seal during pressing against sealing sheet 71. An elastic rubber element 78 that is exposed to compressed air via a line 79 in profile 76 is arranged in a cavity behind the sealing element 77 in profile 76. If compressed air is supplied in the direction of arrow P into the concentric profile 76, rubber seal 78 is compressed and exerts a force on sliding element 77, which, in turn is pressed under the surface of sealing sheet 71. During movement of the X-console 16 and the work tank 42 relative to the fixed machine body 10, the second sealing element 75 is entrained and slides in sealing contact along the outside of sealing sheet 71.

Figure 5:
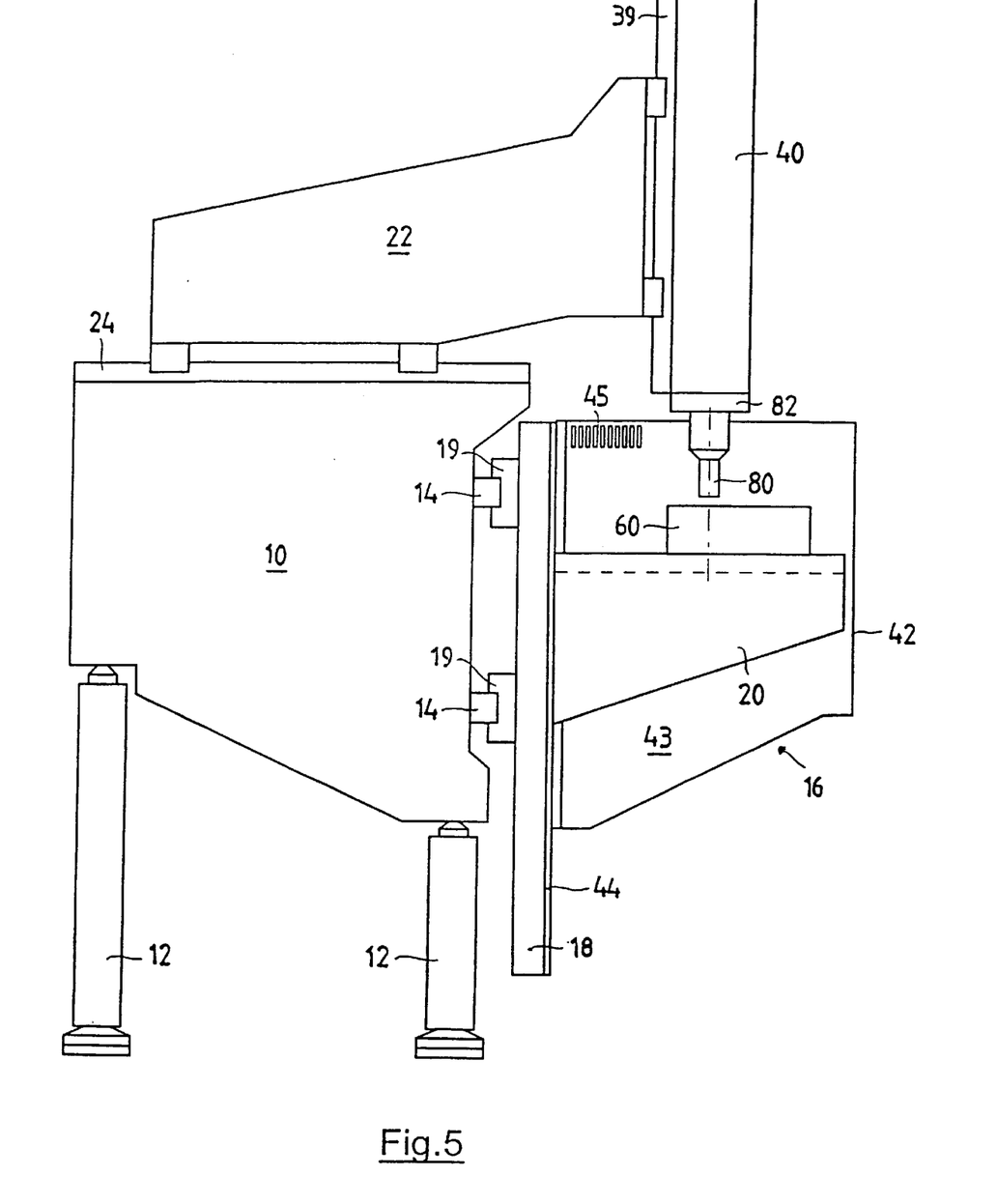
FIG. 5 is a longitudinal cross-sectional view of another EDM machine constructed in accordance with the teachings of the invention, namely, a die-sinking machine.

A die-sinking machine is shown in FIG. 5, which is also constructed in accordance with the teachings of the invention. Corresponding components are also designated with the same reference numbers here. The die-sinking machine also comprises a self-supporting central machine body 10, which is supported on columns 12. An X-console 16 for movement of a workpiece 60 in the X-main axial direction is fastened on the front side of machine body 10 on a vertical surface. A cavity sinking electrode 80 is mounted to move in the Y-main axial direction via a Y-slide 22 mounted to move independently of it on the top of machine body 10. The die-sinking machine also has a quill 40 moveable in the Z direction, on whose front end an electrode head 82 with the cavity sinking electrode 80 accommodated in it is held for machining of the workpiece 60. A work tank 42 to receive any working liquid is arranged to be lowered in the vertical direction on the X-console 16.

It should be emphasized that the base elements of this die-sinking machine, like machine body 10, X-console 16 (except for the missing openings in the X-plate 18 and the work tank rear wall 44 for the lower wire guide arm), as well as the Y-slide 22 and quill 40, correspond to those of the erosive cutting machine according to FIG. 1. In other words, these modules of the machine are useable as a module both for an erosive cutting and for a die-sinking machine, but also for other machine tools, perhaps a milling machine or the like, with the advantage that higher numbers of pieces are achieved and the manufacturing costs can be reduced.

From the foregoing, persons of ordinary skill in the art will appreciate that the disclosed EDM machines comprise a machine frame having a central stationary machine body; a machining electrode to machine a workpiece, in which machining occurs by relative movement in the X/Y main axial direction(s) between the machining electrode and the workpiece (60); and a first axial slide to move the workpiece in one main axial direction and a second axial slide to move the machining electrode in the other main axial direction. The first axial slide is arranged displaceably in an essentially vertical plane laterally on the machine body in the horizontal direction.

The disclosed machine frame preferably has only a single self-supporting machine body, which is supported relative to the floor. In contrast to the multiblock design of known EDM machines (e.g., the two-block design known from U.S. Pat. No. 5,243,165), the disclosed EDM machine is based on a compact monoblock design, in which the X/Y main axial slides are directly connected to the monoblock-like machine body. This guarantees high rigidity of the arrangement overall, very good orthogonality of the X/Y main axial movement and, above all, a short force flow transfer path between the machining electrode and the workpiece, as well as short current paths for better pulse transmission to the spark zones, all of which together are excellent prerequisites for high machining precision of the machine. The limited space requirements of the disclosed machines, as well as the fundamentally simple design of the machine frame and the related economical manufacturing cost of the entire installation, are additional advantages. Greater travel and thus machining of larger workpieces is also readily possible, because of decoupling of the two main axial slides in the X and Y direction.

The first axial slide (say, the X-slide) is preferably fastened laterally on the machine body in an essentially vertical plane and the second axial slide (say, the Y-slide) in an essentially horizontal plane on the top of the machine body. The X- and Y-slides can then be moved, for example, on guide rails that lie directly on the machine body or are arranged laterally on the machine body, so that the loading conditions for the X- and Y-slides remain substantially the same in any position. By arranging the X/Y main axial slides on surfaces of the machine body perpendicular to each other, it is relatively easy to maintain the orthogonality condition, in contrast to a multiblock design.

The first axial slide preferably has a console-like slide mounted to be moved for displacement of the workpiece (for example, in the X-main axial direction), with a substantially horizontal workpiece support surface. Appropriate means to attach one or more workpieces are preferably present on this moving console. The console-like slide preferably also serves as a basis for mounting of a lowerable work tank. The console-like slide and, therefore, the clamped workpiece(s) is/are freely accessible from three sides, including the free access beneath the console, which is not blocked as usual by the machine frame. The work space of the machine is, therefore, very accessible for loading and unloading and for measurement and checking of the machining, and both for the operator and for any means of-automation (like robots, any change system, measurement and monitoring devices or other devices).

The console-like slide preferably comprises a substantially vertical mounting plate, which is guided via guide slides on a rail pair on the machine body. This mounting plate is comparable to a work table of a conventional machine aligned in the X/Y plane, but which is rotated here by 90°. The mounting plate has high rigidity and sufficient dimensions so that it can serve as a basis for a workpiece support and optionally for the rear wall of a work tank . Preferably, a beam-like workpiece support, to support a workpiece directly on the mounting plate, is attached, so that a short force flow path to the workpiece, and also high rigidity of the arrangement is advantageously guaranteed. In this design of the console-like slide, whose components can be precisely manufactured without particular difficulties, good geometric base accuracy is attainable without significant expense.

As is known, high-precision EDM is mostly conducted in a bath of a dielectric working fluid to rinse the working gap and for thermal stabilization of the workpiece. For this purpose, a corresponding work tank to receive the working fluid (called the "work tank") is provided, which encloses the work space of the machine and is filled with working liquid before each machining. After the end of machining, the working liquid is discharged from the work tank and the work tank opened for loading and unloading of the workpiece. The disclosed machines provide a decisive advantage here. Since the region beneath the moving console is substantially free, the disclosed machines can be equipped with a vertically lowerable work tank. This work tank can be moved freely vertically downward without obstacles, so that the work space is freely accessible from at least three sides, for example, for loading and unloading and for measurement and checking of the machining. The disclosed machines are, therefore, excellently suited for implementation of automation devices, for example, automation of the work tank processes and inclusion of pallet changers and robots in the production and transfer lines. Loading by means of a stacker is also favored, because the console-like slide is freely accessible from below.

The work tank is preferably constructed from a moving work tank part, which is open on the side facing the machine body (work tank back side) and a fixed rear wall, which is fastened directly on the mounting plate of the console-like slide; or the mounting plate itself forms the rear wall of the work tank. Vertically running guide rails are preferably provided with a corresponding lifting mechanism on both side walls of the work tank, so that the work tank, or better the moving part of the work tank, can be moved from a work position to a lowered position rapidly. The two-part design guarantees that an automatically lowerable work tank can reliably fulfill its function without expensive motion and sealing mechanisms. Division into only two parts has the additional advantage of minimizing sealing problems to a few surfaces, and additionally, provides the advantage of a comparatively stable work tank.

In another particularly preferred variant, the work tank rear wall and/or the mounting plate are lengthened, so that the moving work tank part lies on the work tank rear wall or against the mounting plate, even in the lowered position, so that, even in this position, as required, "holding" of the working liquid in the work tank is possible. In contrast to known designs, the work space of the disclosed machines can, therefore, be made accessible without. having to empty the working liquid. The disclosed moving work tank part, together with the working liquid contained therein is simply moved vertically into the lowered position, in which it forms a tight receiving vessel for the working liquid. The time required to make the working space of the machine accessible to an operator or an automatic device can, therefore, be substantially reduced, which ensures a drastic improvement in work efficiency. The EDM machine can also be thermally stabilized in the state of the lowered work tank by the contained working liquid. In another preferred variant, regulation of the level of working liquid in the work tank can occur with an overflow integrated in the vertically moveable work tank part, for example, in the form of one or more overflow slits in the work tank wall which are arranged at the level of the desired liquid level.

For sealing of the moving work tank part relative to the fixed work tank rear wall (or the mounting plate itself), a seal or sealing profile-made of an elastomer or a combination, loadable with a fluid, for example, inflatable with air, is preferably arranged, at least in sections, along the contact surfaces of the moving work tank part facing the rear wall. Attachment of the seal(s) can occur, for example, by gluing, clamping or pressing into corresponding profile holders. When the moving part of the work tank reaches the uppermost position, the statically functioning seal is exposed to fluid, so that sealing relative to the rear wall of the work tank (or mounting plate) is produced. In this manner, loading and unloading processes can occur quickly on the machine and, just as quickly, the workpiece and machining electrode can be made freely accessible by lowering the work tank.

In a particularly compact variant, the machine body has a substantially cuboid shape and is supported on the floor via several, and especially three, columns. The volume of the machine body is, therefore, smaller and the space beneath the machine body can be used, for example, to accommodate additional machine components, like a dielectric unit, a spent wire collection vessel or modules for control and the generator. The machine body, as an alternative, can also be directly supported on the machine components just mentioned without special support columns. In a medium design, the machine body is ideally supported on three support sites. In larger machines, the machine body can be constructed to the floor and supported there on three or more support sites. In this case, cavities are preferably provided in the machine body to accommodate modules.

The entire machine is preferably set up in a container. A unit to process the working liquid is situated, at least partially, in the region beneath the lowerable work tank. This arrangement is particularly advantageous because long lines to transfer the working liquid into and out of the work tank are avoided, and filling and emptying of the work tank can occur correspondingly quickly. Moreover, the dielectric unit can also be laid out to accept any leakage liquid from the work tank and to return this automatically to processing of the working liquid.

The disclosed machines preferably also permit additional axial movement systems. For example, for adjustment of the machining electrode to the corresponding workpiece height, a Z-drive is provided to move the machining electrode or an electrode head in the vertical direction. In the case of an erosive cutting machine, the vertical contours of uneven or unequally high workpieces can be simply compensated with an upper wire guide head, moveable in the Z-direction. This also leads to higher removal performance and/or better precision of machining.

Although the previously described variants have referred generally to EDM machines, persons of ordinary skill in the art will appreciate that the teachings of the invention are equally applicable to erosive cutting machines and die-sinking machines. In a preferred variant of an erosive cutting machine, the machining electrode is a wire electrode guided between upper and lower wire guide heads in the working space of the machine. The upper and lower wire guide heads are coupled via corresponding wire guide arms to the second axial slide, in order to move the wire electrode with the second axial slide in one of the main axial directions (say, the Y direction). Moreover, the teachings of the invention also contemplate an erosive cutting machine, in which the upper wire guide head can be moved in a horizontal plane, a so-called U/V plane, relative to the lower wire guide head, in order to be able to carry out conical cuts. For this purpose, two U/V axial slides, adjustable at right angles to each other (for example, a Cartesian U/V cross slide), are inserted in the transfer path between the upper wide guide head of a second axial slide.

Preferably, the lower wire guide arm of the erosive cutting machine runs in the interior of the machine body and extends through an-opening oriented in the direction of one main axis (for example, the X axis) of the mounting plate of the console-like slide, and through the optionally attached work tank rear wall in the work space of the machine. The lower wire guide arm is sealed in the rear wall by a first elastic sealing device in the axial direction of the wire guide arm and by a second sealing device that can be slid across the axial direction relative to the work tank. The first sealing device is preferably a bellows seal concentrically enclosing the wire guide arm. The second sealing device, for slideable sealing between the wire guide arm and the work tank, preferably has at least one sliding part and an elastic equalization element, in which the elastic equalization element exerts a force on the sliding part when exposed to a fluid (for example, a rubber seal that can be loaded with compressed air). Other variants for an-appropriate sliding seal are known (for example, from EP 0 467 060 A1 of the applicant, which is hereby incorporated herein in its entirety by reference). In principle, however, all possible combinations of these seals can be used. It is then advantageous that operationally reliable sealing can be achieved simply at reasonable cost, and such sealing is easy to produce and install with these expedients. The lower wire guide arm can move relative to the work tank in the X/Y main axial directions with limited resistance and while remaining fluid-tight.

The basic elements of the machines described herein are not only applicable to EDM machines, but also to other types of machine tools in which machining occurs by relative movement in the X/Y main axial direction(s) between a machining tool and a workpiece (for example, milling machines, drilling machines, grinding machines or the like). For this purpose, a module set is made available for assembly of machine tools, especially EDM machines. The set preferably has several of the following modules: a central machine body; a first console-like slide for movement of a workpiece in a first main axial direction (say, the X direction), and for arrangement on the machine body; and a second axial slide for movement of a machining tool in a second main axial direction (say, the Y direction) and for arrangement on the machine body. These modules are laid out so that they can be used for assembly of different types of machine tools, for example, die-sinking machines, erosive cutting machines, milling machines or the like). These base modules form the elements of a module, with which different types of machine tools can be assembled. In one variant, the base elements can be used in order to construct, for example, a milling or die-sinking machine. In an expanded variant with additional U/V and/or Z-drives, an erosive cutting machine can be produced. The same substantial machine modules can, therefore, be used for different machine variants, with the advantage of cost-effective production of machine tools.

To summarize, the disclosed machines achieve the following advantages:

- a compact, self-supporting monoblock design with short force flow path between the tool and workpiece (i.e., high mechanical rigidity and thus high precision of machining);
- good accessibility from at least three sides to the work space and free access beneath the console-like slide (for example, loading with a stacker, is possible);
- problem-free implementation of automation measures possible, especially automation of the work tank, pallet changer or robots;
- simple design and low manufacturing costs of the entire machine;
- limited space requirements; and
- a modular concept for assembly of different types of machine tools.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. An electric discharge machining apparatus for machining a workpiece comprising:
    a machine frame having a central stationary machine body;
    a machining electrode to machine the workpiece, wherein machining occurs by producing a relative movement in at least one of a first axial direction and a second axial direction between the machining electrode and the workpiece;
    a first axial slide for moving the workpiece in a first one of the first and second axial directions; and
    a second axial slide for moving the machining electrode in a second one of the first and second axial directions, wherein the first axial slide is mounted in a substantially vertical plane on the machine body for movement in a substantially horizontal direction.

2. An electric discharge machining apparatus as defined in claim 1, wherein the second axial slide is disposed in a substantially horizontal plane on top of the machine body.

3. An electric discharge machining apparatus as defined in claim 1, wherein the first axial slide has a moveable console slide on which the workpiece can be mounted in a substantially horizontal position.

4. An electric discharge machining apparatus as defined in claim 3, wherein the console slide includes a substantially vertical mounting plate which is guided via guide slides on a pair of rails on the machine body.

5. An electric discharge machining apparatus as defined in claim 4, further comprising a workpiece support having a substantially horizontal workpiece support surface mounted directly on the mounting plate.

6. An electric discharge machining apparatus as defined in claim 3, further comprising a vertically lowerable work tank to receive a working liquid, the work tank being mounted on the console slide.

7. An electric discharge machining apparatus as defined in claim 6, wherein the work tank comprises:
    a moveable work tank part which is open toward a work tank back side; and
    a fixed work tank rear wall.

8. An electric discharge machining apparatus as defined in claim 7 wherein the fixed work tank rear wall is attached directly to the mounting plate.

9. An electric discharge machining apparatus as defined in claim 7 wherein the fixed work tank rear wall comprises the mounting plate.

10. An electric discharge machining apparatus as defined in claim 7, wherein at least one of the work tank rear wall and the mounting plate is lengthened so that the moving work tank part lies against the at least one of the work tank rear wall and the mounting plate even when the moving work tank part is in a lowered position.

11. An electric discharge machining apparatus as defined in claim 7, further comprising a seal for sealing the moving work tank part of the work tank relative to the work tank rear wall, the seal being loadable with a fluid.

12. An electric discharge machining apparatus as defined in claim 11 wherein the seal comprises a sealing profile.

13. An electric discharge machining apparatus as defined in claim 12 wherein the sealing profile is made of elastomer.

14. An electric discharge machining apparatus as defined in claim 11 further comprising an elastomer sealing profile.

15. An electric discharge machining apparatus as defined in claim 11 wherein the seal is arranged along contact surfaces of the moving work tank part facing the work tank rear wall.

16. An electric discharge machining apparatus as defined in claim 6, wherein the machine is located on a container, and further comprising a unit for processing working liquid, the unit being located in a region beneath the lowerable work tank.

17. An electric discharge machining apparatus as defined in claim 1, further comprising a Z-drive for adjusting at least one of the machining electrode and an electrode head to the corresponding workpiece height.

18. An electric discharge machining apparatus as defined in claim 1, wherein the machining electrode comprises a wire electrode guided between an upper guide head and a lower wire guide head, wherein the lower and upper wire guide heads are each connected to the second axial slide via a corresponding wire guide arm.

19. An electric discharge machining apparatus as defined in claim 18, further comprising two axial slides located in a transfer path between the upper wire guide head and the second axial slide for movement of the upper wire guide head in a horizontal plane, the two axial slides being adjustable at right angles to each other.

20. An electric discharge machining apparatus as defined in claim 18, wherein the lower wire guide arm extends through an elongated opening in the mounting plate of the first axial slide and a rear wall of a work tank into a work space of the machine, the elongated opening being oriented in the first axial direction, the lower wire guide arm being sealed by a first elastic sealing device in an axial direction of the lower wire guide arm and by a second sealing device that can slide across the axial direction relative to work tank.

21. An electric discharge machining apparatus as defined in claim 20, wherein the first sealing device comprises a bellows seal concentrically enclosing the lower wire guide arm.

22. An electric discharge machining apparatus as defined in claim 20, wherein the second sealing device comprises:

at least one sliding part for sliding sealing between the lower wire guide arm and the work tank; and an elastic equalization element which is positioned to exert a force on the at least one sliding part when loaded by a fluid.

23. An electric discharge machining apparatus as defined in claim 1, wherein the central machine body is supported relative to the floor on several columns.

24. A mount set for assembling a machine tool comprising the following modules:

a central machine body;

a first axial slide for movement of a workpiece in a first axial direction, the first slide being adapted for mounting in a substantially vertical plane on the machine body for movement in a substantially horizontal direction; and a second axial slide for movement of a machining tool in a second axial direction, the second slide being adapted for mounting on the machine body wherein the modules can be used for assembly of at least one of: a die-sinking machine and an erosive cutting machine.

25. An electric discharge machining apparatus for machining a workpiece comprising:

a machine frame having a central stationary machine body;

a machining electrode to machine the workpiece, wherein machining occurs by producing a relative movement in at least one of a first axial direction and a second axial direction between the machining electrode and the workpiece;

a first axial slide for moving the workpiece in a first one of the first and second axial directions; and a second axial slide mounted on the machine body for moving the machining electrode in a second one of the first and second axial directions, wherein the first axial slide is mounted in a substantially vertical plane on the machine body for movement in a substantially horizontal direction.

* * * * *